United States Patent [19]
Johnson

[11] 4,207,358
[45] Jun. 10, 1980

[54] IMPREGNATING SOLID POLYOLEFIN WITH SMALL SIZE PARTICLES

[75] Inventor: Paul H. Johnson, Bartlesville, Okla.

[73] Assignee: Phillips Petroleum Company, Bartlesville, Okla.

[21] Appl. No.: 806,656

[22] Filed: Jun. 15, 1977

[51] Int. Cl.² .............................................. B05D 7/02
[52] U.S. Cl. ...................................... 427/185; 260/42; 427/213
[58] Field of Search .................... 260/42; 427/213, 185

[56] References Cited

U.S. PATENT DOCUMENTS

| | | | |
|---|---|---|---|
| 2,718,471 | 9/1955 | Samler | 260/42 |
| 2,719,135 | 9/1965 | Wood | 260/42 |
| 3,030,330 | 4/1962 | Cines et al. | 260/42 |
| 3,271,185 | 9/1966 | Pollock | 427/213 |

FOREIGN PATENT DOCUMENTS 696248 10/1964 Canada ................................. 427/213

Primary Examiner—James H. Derrington

[57] ABSTRACT

Broadly, finely divided material or particles which are readily carried in or by a gaseous or vaporous fluid are caused to impinge upon solid polyolefin particles to maintain fluidized during contacting by use of a gaseous or vaporous material carrying said particles. In one embodiment, carbon black reactor smoke at a suitable temperature is employed to fluidize a bed of finely divided polyolefin, e.g., polyethylene, thus producing particles of plastic containing carbon black pigment. In this embodiment, off gas from the fluidized zone, preferably on separation from entrained solids, is burned in a wet pellet dryer in which carbon black from a carbon black reactor effluent is processed. Recovered solids can be returned to the fluidized operation. The carbon black-impregnated polyolefin product is recovered from the fluidized bed.

11 Claims, 1 Drawing Figure

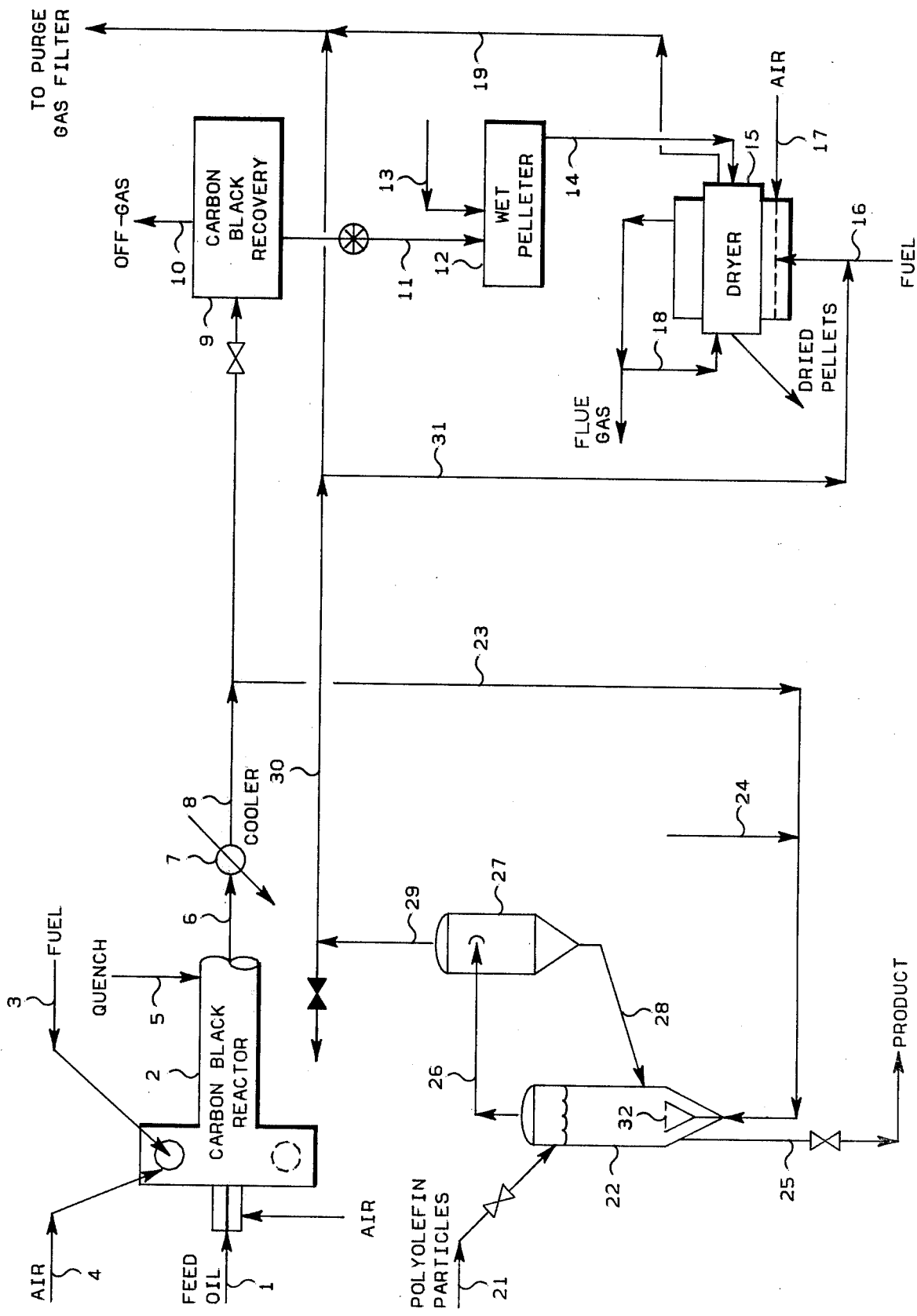

IMPREGNATING SOLID POLYOLEFIN WITH SMALL SIZE PARTICLES

This invention relates to impregnating solid particles with finely divided particles of a different material. In one of its aspects, it relates to the impregnation of a polyolefin, e.g., polyethylene, with a finely divided particulate material, e.g., carbon black.

In one of its concepts, the invention provides a method for impregnating a polyolefin with a solid particulate material by having the solid particulate material suspended in a gaseous or vaporous material suitable for fluidizing the polyolefin particles, fluidizing the polyolefin with said gaseous or vaporous material, maintaining contact of the polyolefin particle and gaseous or vaporous fluid until suitable impregnation has been achieved, and then recovering impregnated solid polyolefin particles.

In another of its concepts, the invention provides for the impregnation of a polyolefin, e.g., polyethylene, with carbon black by fluidizing finely divided polyethylene using for this purpose a carbon black reactor smoke at a temperature and under conditions to soften the polyethylene sufficiently to cause it to retain a desired amount of carbon black whereupon the remainder of the smoke and impregnated solid polyolefin particles are separated from each other.

It is known to pigment solid olefin polymers by dry blending said polymers in cellular form with carbon black. U.S. Pat. No. 3,030,330, Apr. 17, 1962, M. R. Cines and E. J. Kosinsky. The patent discloses a method of incorporating carbon black into a solid polymer of mono-1-olefins having from 2 to 8 carbon atoms per molecule which comprises mixing said carbon black in its dry, particulate state with particles of said polymer to form a dry, granular mixture, said polymer having been precipitated from solution to place it in an expanded form having voids within the particle and having a bulk density of from about 8 to 22 pounds per cubic foot, and subjecting said mixture to mechanical working which produces high shear within the polymer, fusing said polymer, and extruding a uniform product.

It is also known to produce a dispersion of carbon black in polyolefin. U.S. Pat. No. 3,206,419, Sept. 14, 1965, James E. Pritchard and Archie L. Robbins. The patent, which claims a method and composition, claims a process for uniformly dispersing finely divided carbon black in a solid polyolefin, said polyolefin being formed by polymerizing 1-olefins of 2-8 carbon atoms, which comprises the steps: grinding carbon black with a polar material soluble in water and essentially insoluble in hydrocarbons and incompatible with said polymer in amounts sufficient to form a paste containing from 10-35 weight percent of said carbon black; mixing said paste with said polyolefin in amounts sufficient to form a blend containing from 0.1 to 5 weight percent of carbon black and 0.15 to 12 weight percent polar material; and mechanically working the blend thus formed at a temperature above the softening temperature of said polyolefin until a uniform dispersion of carbon black and polar material in said polyolefin is obtained.

U.S. Pat. No. 3,997,494, Dec. 14, 1976, Ray C. Lever and E. V. Wilkus, discloses compounding thermoplastic polymeric materials and fillers by mixing the thermoplastic polymeric material in particulate form with particulate filler, and in progressive sequence melting the surface portion of the thermoplastic particles, blending the filler with said molten surface portion of the thermoplastic particles and removing the resultant blended melt and filler from the surface of the thermoplastic particles. The mixing and melting, and the blending and removing, are continued until the filler is substantially assimilated into the polymeric material and the thermoplastic particles become substantially diminished by melting and blending, or the method can be carried further, if desired. The patent states that any type of mixing device providing a sufficient degree of agitation will suffice.

The disclosures of the above-noted patents are incorporated herein by reference.

The handling of finely divided particulate materials or pigments for incorporation into solid polyolefin is fraught with a number of difficulties, especially when the pigment to be incorporated is one which will produce readily dusting or is otherwise difficult to handle. Further, the energy requirements for mixing or working together solid polyolefin and particulate material or pigment or carbon black are a factor, especially when our country faces energy problems.

Further, it is desirable to have a method for incorporating a finely dispersed pigment, e.g., carbon black, into a solid polyolefin, e.g., polyethylene, in a readily controlled manner utilizing the finely divided pigment or carbon black as it may be present in a gaseous or vaporous fluid, e.g., carbon black in carbon black reactor smoke.

It is an object of this invention to blend together or to impregnate a solid polyolefin with a finely divided solid particulate material, e.g., a pigment, for example, carbon black. Another object of the invention is to provide a method for impregnating a solid polyolefin with a finely divided dispersed material, e.g., carbon black in carbon black smoke. It is a further object of this invention to provide a readily controllable method for impregnating a solid polyolefin with carbon black with savings of energy and without separating the carbon black from the carbon black smoke from the reactor.

Other aspects, concepts, objects, and the several advantages of this invention are apparent from a study of this disclosure, the drawing, and the appended claims.

According to the present invention, there is provided a method for the impregnation of a solid polyolefin particle with another particle which comprises fluidizing a bed of subdivided polyolefin with a fluidizing medium comprising said another particle.

In one embodiment of the invention, a finely divided polyolefin, e.g., polyethylene, is fluidized employing as fluidizing medium a carbon black reactor smoke.

Depending upon the softening point of the polyolefin and other conditions which one skilled in the art in possession of this disclosure will recognize are to be considered the temperature of the carbon black reactor smoke will be adjusted to be within the approximate range of from about 300° to about 600° F.

Still further, according to the invention, there is provided a combination of steps of operation in which offgas from the zone in which the polyolefin is fluidized is treated as by way of a cyclone separator to separate from it entrained solids whereupon the gas is burned; in the case of impregnation of polyolefin with carbon black, the gas is burned in the wet pellet dryer in which carbon black taken from the carbon black effluent is processed.

The recovered solids from the cyclone or other separation zone can be returned to the fluidized zone to there serve to control or adjust the impregnation taking place and to render the process more economical.

| Calculated Example | | |
|---|---|---|
|  | Ranges | Specific |
| Stream (23) - Carbon Black Smoke: | | |
| Pressure, psig. | 3 to 50 | 6 |
| Temperature, °F. | 300 to 600 | 450 |
| Total Flow, SCF/Hr. | (a) | 100,000 |
| Pounds Carbon Black/SCF | 0.005 to 0.015 | 0.01 |
| Carbon Particle Size, millimicron | 1 to 5,000 | 40 to 48[b] |
| Pounds Carbon Black/Hr. | (a) | 1,000 |
| Stream (21) - Polyethylene "Fluff": | | |
| Particle Size, U.S. Std. Sieve | 10 to 60 | 20 to 40 |
| Bulk Density, gms./cc. | 0.4 to 0.6 | 0.5 |
| Pounds/Hour | (c) | 2,000 |
| Pigmented Product (25): | | |
| Total Pounds/Hr. | (d) | 2,900[e] |
| Pounds Carbon Black/100 Pounds Polyethylene | 5 to 75 | 45 |
| Fluidized Zone (22): | | |
| Temperature, °F. | 300 to 600 | 450 |
| Pressure, psig. | 3 to 50 | 6 |
| Carbon Black/Polyethylene Wt. Ratio | 0.1 to 1 to 1 to 1 | 0.5 to 1 |
| Residence Time, min., for Polyethylene | 5 to 60 | 20 |
| Smoke Velocity, Ft./Sec., Empty Unit | 5 to 50 | 10 |
| Zone Height, Ft. | (d) | 15 |
| Zone Diameter, Ft. | (d) | 2 |

[a]Depends on size of Unit 22.
[b]ASTM N 550 Carbon Black.
[c]Depends on size of Unit (240 to 17,000 lb./hr. is in practical range).
[d]Depend on size of Unit 22 (250 to 30,000 lb./hr. is practical range for 5 to 75 lbs. carbon black/100 lbs. of polyethylene).
[e]Some carbon black is vented and not retained on polymer.

Referring now to the drawing, the operation of the invention will be described in connection with the addition of carbon black to polyethylene "fluff" or fine particles. It will be understood that any polyolefin to which the invention is applicable can be substituted at least in part for the polyethylene. Polyolefins to which the invention is applicable are well known in the art, as exemplified by the disclosures of patents incorporated herein by reference.

A make oil 1 is introduced into carbon black reactor 2 in which the oil is converted by combustion gases produced by fuel 3 which is combusted by air 4. The carbon black reactor diagrammatically shown is known as a tangential combustion gas inlet reactor. Such reactors are well known in the art and are amply described respecting their construction and operation. The carbon black reactor and operation thereof is known in the art to which the reader is referred. The carbon black smoke can be produced in a carbon black reactor such as that shown in U.S. Pat. No. 2,564,700, Aug. 21, 1951, J. C. Krejci; or in U.S. Pat. No. 2,375,795, May 15, 1945, J. C. Krejci; and, preferably, the hot reactor smoke is quenched by recycled cooled smoke as shown in U.S. Pat. No. 3,369,870, Feb. 20, 1968, S. F. Ganz and A. A. Hoffman, Jr.

Briefly, then, the make oil which is sprayed into the carbon black reactor is subjected to carbon black-forming reaction conditions to form carbon black. The carbon black is suspended in very hot gases which are quenched by quench water or cooled, recycle carbon black smoke introduced at 5. The gases which are still hot pass by 6 through cooling zone 7 to be cooled, in this embodiment of the invention, to a temperature in the range of from about 300° to about 600° F. This smoke 8, i.e., gas-containing carbon black, in a usual operation will be passed to filters or bags 9. An offgas 10 is produced while flocculent carbon black is accumulated in the bags and passes by 11 to wet pelleter 12 to which water or pelleting fluid is added at 13. Wet pellets of carbon black pass by 14 into pellet dryer 15 which is heated by combusting some fuel 16 with air 17. After the combustion gas thus produced is used to heat the dryer 15 externally, it is passed in part by 18 into and through the dryer and by 19 to purge gas filter, not shown for sake of simplicity.

According to the invention, polyethylene particles are fed by 21 into a contacting vessel 22 in which fluidizing conditions are maintained. According to the invention, the fluidizing conditions are produced at least in part by passing carbon black smoke from 8 by 23 into contactor 22, as shown.

It is within the scope of the invention to add some or all of the polyethylene fed to the operation through pipe 24 or otherwise as may be helpful not only to maintain proper fluidized conditions in contactor 22, but also to obtain the desired degree and kind of impregnation of the polyethylene particles with the carbon black contained in the smoke. Pigmented polyethylene is removed at 25 as "masterbatch" of carbon black-impregnated polyethylene. Overhead gases which unavoidably contain some entrained particles are passed by 26 to cyclone 27. Separated solids are returned from cyclone 27 by 28 to contactor 22. Cyclone overhead 29 can be passed via 30, and 31 to the dryer 15 to supply at least a portion of the fuel requirement therefor.

Preferably, a distributing grid 32 is located in the path of the carbon black-containing smoke to evenly distribute the smoke within zone 22, the grid acting as a "base" for the fluidized bed.

The fluidizing gas containing carbon black 23 can be produced by means other than that described hereinabove. That is, hot flue gases, very lean in free oxygen, can be used as the fluidizing gas to which flocculent carbon black can be added. Other hot inert gases can be used, e.g., hot nitrogen. The flocculent black can be added to this "inert" hot gas from a storage bin via a star valve and the like, not shown.

The operation has been described as a continuous process for both the polyethylene and the smoke. Of course, a fluidized fixed bed can be used. That is, a batch of polyolefin particles can be added to zone 22, and hot gas containing fine particles of carbon black can be added continuously to effect the fluidized, fixed bed impregnation of the polyolefin particles.

It will be evident to one skilled in the art in possession of this disclosure having studied the same that the invention provides in addition to a really neat way in which to impregnate the polyethylene particles a combination operation wherein savings and convenience result from the concomitant use of the smoke, not only to impregnate the particles, but also to thereafter use it as fuel.

Further, importantly, the direct use of the smoke permits impregnation of the polyolefin with a fresh carbon black which has not been in any way handled beyond quench and cooling, thus permitting the combining of the freshest possible uncontaminated carbon black with the polyolefin.

Reasonable variation and modification are possible within the scope of the foregoing disclosure, the drawing, and the appended claims to the invention the essence of which is that a solid polyolefin, e.g., polyethylene, is impregnated with a finely divided particulate material or pigment, e.g., carbon black, in a fluidized zone in which the pigment or particle is carried in a gaseous or vaporous medium, e.g., carbon black smoke from a carbon black-producing reactor, and the said gaseous or vaporous medium or carbon black smoke is a fluidizing medium.

I claim:

1. A method for impregnating a solid polyolefin with a finely divided, substantially solid substance, which comprises suspending the impregnating substance in a hot gaseous fluidizing medium which is used to fluidize a mass of solid polyolefin particles under conditions, including a temperature of said medium which will in said medium, soften the solid polyolefin particles which remain solid though softened sufficiently to cause said solid, softened particles in said fluidizing medium to retain a desired amount of said substance when contacted while softened and in said hot gaseous fluidizing medium with said impregnating substance, and fluidizing a bed of solid polyolefin particles under said conditions with said hot gaseous fluidizing medium containing said impregnating substance.

2. A method according to claim 1 wherein the polyolefin is impregnated with carbon black as it is obtained from a carbon black-producing reactor as a smoke.

3. A method according to claim 1 wherein polyethylene is impregnated with carbon black contained in a carbon black reactor smoke.

4. A method according to claim 1 wherein offgas from said method is treated to separate therefrom solids and then burned in a carbon black pelleting process.

5. A method according to claim 1 wherein solids recovered from the offgas of said method are returned for use in the fluidizing medium.

6. A method according to claim 3 wherein the polyethylene is fluidized with aid of said smoke.

7. A method according to claim 3 wherein offgas from said method is treated to separate therefrom solids and then burned in a carbon black pelleting process.

8. A method for impregnating a solid polyolefin with a finely divided, substantially solid substance consisting essentially of carbon black particles as obtained from a carbon black containing smoke to incorporate said particles into said solid polyolefin which comprises suspending said impregnating substance in a hot gaseous fluidizing medium which is used to fluidize a mass of solid polyolefin particles under conditions, including a temperature of said medium which will in said medium, soften the solid polyolefin particles which remain solid though softened sufficiently to cause said solid, softened particles in said fluidizing medium to retain a desired amount of said substance when contacted while softened and in said hot gaseous fluidizing medium with said impregnating substance, and fluidizing a bed of solid polyolefin particles under said conditions with said hot gaseous fluidizing medium containing said impregnating substance.

9. A method according to claim 8 wherein the carbon black has a particle size in the range 1–5,000 millimicrons.

10. A method according to claim 9 wherein the carbon black smoke is at a pressure in the range of about 3–50 psig and the solid polyolefin is polyethylene fluff.

11. A method according to claim 8 wherein the polyolefin is a polyethylene, the polyolefin particles are fluidized employing carbon black smoke as produced from a carbon black producing reactor, the temperature of the carbon black smoke is adjusted to be in the approximate range 300°–600° F. so that the temperature in the fluidized bed will be in this range and the pressure in the bed is in the approximate range 3–50 psig, the carbon black to polyolefin weight ratio being in the approximate range 0.1:1.1 to 1:1.

* * * * *